June 2, 1953　　　F. N. G. KRANICK　　　2,640,308
EXPANSIBLE DISK HARROW
Filed Aug. 9, 1948　　　　　　　　　　　　2 Sheets-Sheet 1
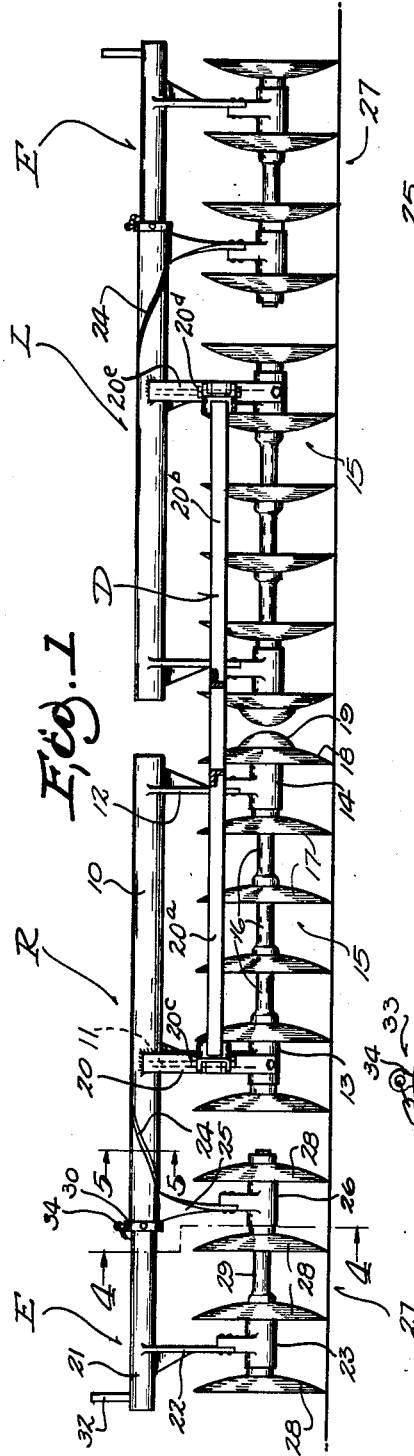
INVENTOR.
FRANK N. G. KRANICK
BY
Emerson B. Donnell
ATTORNEY

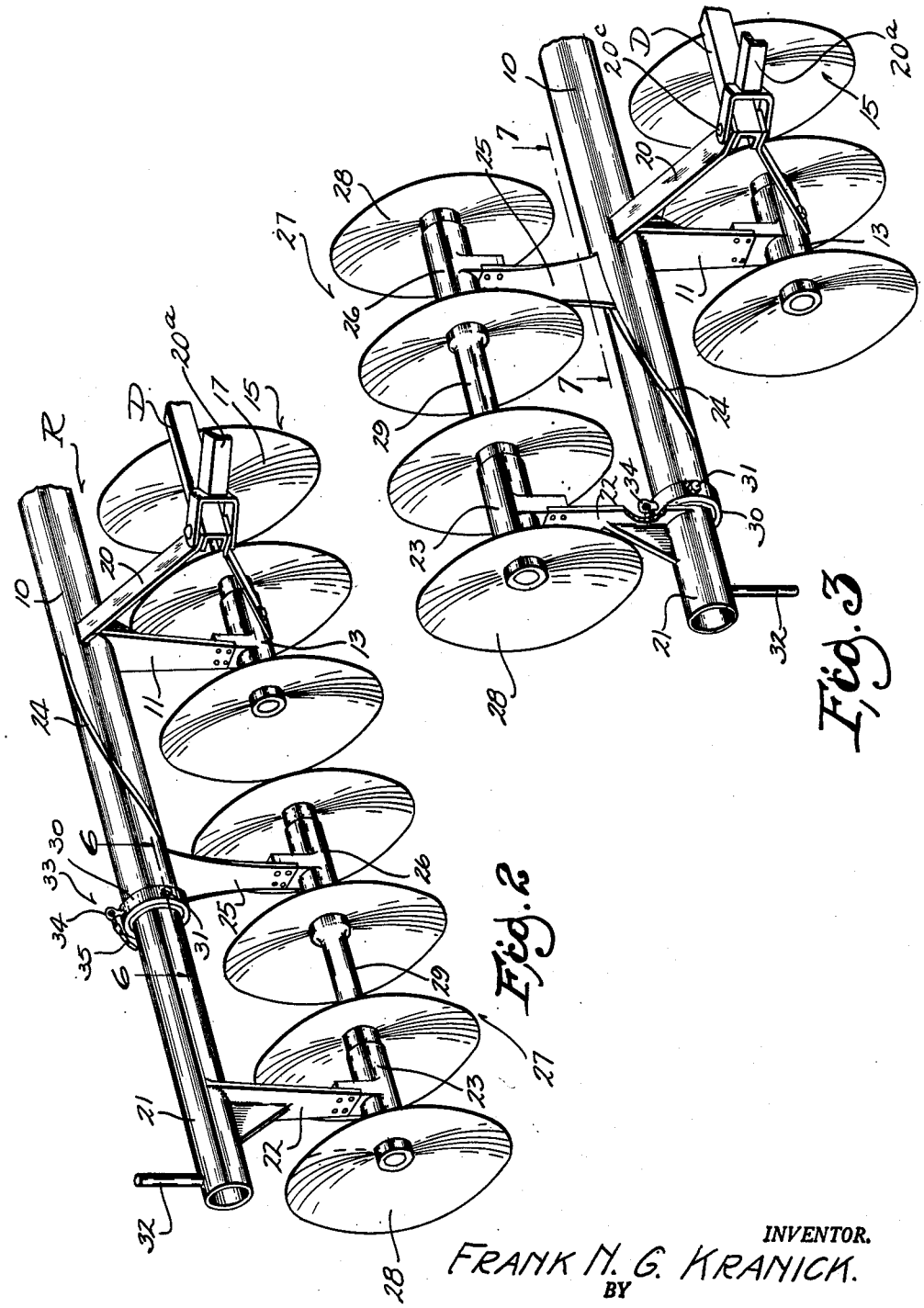

Patented June 2, 1953

2,640,308

UNITED STATES PATENT OFFICE 2,640,308

EXPANSIBLE DISK HARROW

Frank N. G. Kranick, Racine, Wis., assignor to J. I. Case Company, Racine, Wis., a corporation of Wisconsin Application August 9, 1948, Serial No. 43,199

5 Claims. (Cl. 55—81)

1

The present invention relates to disk harrows and particularly to a so-called wide type harrow in which each of the gangs is arranged in sections whereby the harrow may be reduced in width for purposes of transportation, and other purposes, by withdrawing the outer sections and placing them inwardly from operative position and an object of the invention is to provide a wide type harrow which has end portions that can be withdrawn in a novel manner so as to reduce the spread of the harrow for various purposes, including convenient transportation and to allow for passage through gates and other restricted areas.

Another object is to provide a harrow with a length reducing means that requires less effort in manipulation than prior length reducing means and one which is not likely to cause injury to the operator when being manipulated.

Another object is to provide a construction that, when extended for use will be rigid and will remain aligned with the main portion of the harrow as an integral unit.

Another object is to provide a wide type harrow which has end portions that can be withdrawn and so positioned as to add weight to the portions which are not withdrawn so as to improve operation under difficult conditions.

Another object is to provide a locking means that will prevent the extensions from accidently shifting to working position after having been withdrawn from such position.

Further objects and advantages will become apparent from a consideration of the following detailed description taken in connection with the accompanying drawings wherein a satisfactory embodiment of the invention is shown, it being understood however that the invention is not to be taken as limited to the details disclosed which are intended as exemplary rather than restrictive.

Referring to the drawings:

Figure 1 is a front elevation of the harrow having the extensions in working position and with parts broken away;

Fig. 2 is a perspective view of the right extension portion in operating position;

Fig. 3 is a similar view with the extension portion withdrawn from working position;

Fig. 4 is a vertical sectional view on the line 4—4 of Fig. 1;

Fig. 5 is a vertical sectional view on the line 5—5 of Fig. 1;

Fig. 6 is a fragmentary horizontal sectional view taken on the line 6—6 of Fig. 2;

2

Fig. 7 is a horizontal sectional view taken on the line 7—7 of Fig. 3.

In general, the illustrative embodiment comprises "right" and "left" harrow gangs generally designated as R and L respectively, a draw bar generally designated as D connecting the gangs and detaining them in position for operation as a unit, and providing the necessary draft or propelling force for actuating the harrow in operation, or for transport. Each of the gangs R and L has at its outer extremity an extension E and E' respectively, which may be readily thrown into and out of operation at will as will presently appear.

Since gangs R and L are substantially identical as to all details with the exception that one is right and the other is left, it is necessary to describe in detail only one of the gangs. The gang R will, therefore, be described in this manner.

As best seen in Fig. 1, a main frame for the gang comprises a tubular member 10 which extends laterally and substantially parallel to the ground and has depending therefrom bearing brackets 11 and 12. Bearings 13 and 14 of suitable, or well-known type, are fixed to the lower ends of brackets 11 and 12, and a main gang of disks generally designated as 15 is journaled in said bearings. Gang 15 comprises a plurality of spools 16—16 and disks 17—17 mounted on a common shaft in well-known manner. The inner disk 18 has a cap or bumper 19 which cooperates with a similar cap on the set of disks on gang L so that the inward thrust caused by the working of the harrow when the gangs are angled is taken on these bumpers, one gang R balancing the inward thrust of the other gang L.

Draw bar D is connected to a bracket 20 which in turn is secured to tubular member 10 and above mentioned bearing 13, and it is provided with forwardly converging elements 20ª and 20ᵇ which connect with any suitable tractor or other propelling vehicle not shown, it being possible through a variety of expedients which are well-known to cause swinging of gangs R and L about pivotal connections 20ᶜ and 20ᵈ between above mentioned bracket 20 and member 20ª, and between a bracket 20ᵉ and above mentioned member 20ᵇ.

Such expedients are fully disclosed in the patent to Rutter 2,377,521. The resulting structure is a single action disk harrow of the wide type and which is effective in covering a large area in a minimum of time. However such harrows are cumbersome and difficult to transport on the highway and through farm gates and the like, and for this reason expedients are commonly provided to shorten the gangs and thereby reduce the over-all width of the implement. Above mentioned extension E is provided for this purpose, when in working position constituting merely a part of gang R. Extension E has a tubular member 21 which serves to transmit the propelling force from tubular member 10 to the extension and it has depending therefrom a bearing bracket 22 having a journal bearing 23 secured to its lower end. Tubular member 21 is freely slidable and rotatable within tubular member 10 by reason of which movement extension E may be shifted from working to non-working position. Owing to the fit of the parts, tubular member 21 is substantially rigid with tubular member 10 when extended.

A second bearing bracket extends from tubular member 21 through a helical slot opening, or aperture 24 extending axially and inwardly from the outer end of tubular member 10, said bracket being designated 25, and slot 24 extends from the end of tubular member 10 in the present instance at the bottom or underside thereof axially of tubular member 10 in a counter-clockwise direction of rotation as viewed from the left in Fig. 1, until it has reached the top of tubular member 10. Thus slot 24 extends preferably a little more than 180° about tubular member 10 and constitutes a cam-slot in which bracket 25 may slide from a depending position to a substantially vertical position.

While it is preferred that slot 24 in tubular member 10 shall extend as described and consequently embody a so-called "left hand" helical slot for reasons which will appear, it is to be understood that many of the advantages of the invention can be realized with a slot which extends in the other direction to form a so-called "right hand" helical slot.

Tubular member 21 extends into tubular member 10 a substantial distance so as to provide adequate support for extension E and to result in the aforesaid substantially rigid relation between the two tubular members.

Bracket 25 is so formed as to conform with the helical configuration of slot 24 and acts as a guide to co-ordinate the axial and rotary movement of extension E. Bracket 25 carries a journal bearing 26 secured thereto and a gang of disks generally designated as 27 is journaled in bearings 23 and 26 and is independent of above mentioned gang 15. Gang 27 comprises a plurality of disks 28—28 and a spool member 29, all similar to those in gang 15.

To facilitate assembling extension E with gang R, slot 24 is continued through the end of tubular member 10. Tubular member 21 may, therefore, be inserted in tubular member 10 and bracket 25 may enter slot 24 without difficulty. A stop and reinforcing ring 30 is secured at the end of tubular member 10 and serves to strengthen it where it would otherwise be weakened by slot 24. Ring 30 also serves to prevent inadvertent removal of bracket 25 and as a means to limit the outward movement of tubular member 21. Ring 30 is secured to tubular member 10 by cap screws 31—31. A handle 32 is suitably fastened to tubular member 21 to aid in manipulating extension E.

In view of the position of slot 24 on the front "side" of tubular member 10, the rearward ground reaction when the harrow is working will tend to swing brackets 22 and 25 in a rearward direction which is opposite to the direction of the swinging, or rotation, of extension E when it is being retracted or moved into inoperative position. Accordingly this rearward reaction will tend to maintain extension E in working position. In addition to the rearward reaction, there is also an inward axial thrust on extension E which will tend to move the extension toward a retracted position. This inward thrust will be opposed by the above mentioned rearward thrust so that the extension will ordinarily be held in place by these natural forces. However in order to insure that extension E will remain in place there is provided a locking means 33 as shown in Figs. 2 and 3. This comprises a pin 34 having attached thereto a length of chain 35 which is fastened to a clip 36 (Fig. 4) secured against ring 30 by means of one of the cap screws 31 so as to secure the chain and pin against loss. Ring 30, tubular member 10, and tubular member 21 have holes which become aligned in working position of extension E so as to receive pin 34 as shown in Fig. 2. Another hole is positioned in tubular member 21 which will become aligned with the holes in ring 30 and tubular member 10 when extension E is in the withdrawn or retracted position shown in Fig. 3. In this way, extension E is positively maintained in either of its predetermined positions and there is no likelihood of the extensions shifting inwardly under the inward thrust, if the latter should happen to predominate over the rearward thrust when the harrow is operating.

It will be apparent that a substantial axial movement of extension E is necessary with a comparatively small rotative movement thereof owing to the rather rapid lead of slot 24. This aids in maintaining extension E in control when it is being moved from withdrawn to active position. The heavy disks cannot fall on the operator because the lead of spiral slot 24 is so rapid that the device becomes substantially self-locking. In other words, the friction in slot 24 set up by the rotative component is as great, or greater, than the axial component resulting from the rotative tendency of the disks. The extension can be readily controlled when being lowered into place and may, in fact, need to be helped a little by a light pull on handle 32. On the other hand when it is desired to retract the disks they are lifted through their arc of rotation while tubular member 21 is slid into tubular member 10 by a thrust on handle 32. This move can be initiated, if desired, by backing the harrow slightly if disks 28 are in the ground.

As will be apparent, pin 34 is removed for the time being when these changes are made.

An advantage of the device when penetration is difficult is that extensions E and E' may be raised, in which case their weight is added to gangs R and L while at the same time a number of disks, in the present instance 8, are removed from contact with the ground so that the weight per disk is increased very materially.

The same characteristics and procedure apply to extension E' so that widening or narrowing of the harrow is easily accomplished by the construction disclosed.

The operation of the device is thought to be clear from the foregoing description, it being apparent that the harrow can readily be made wider or narrower by manipulating the extensions E and E' as described, that the extensions when withdrawn will provide additional weight to assist in providing penetration, that the device requires only a reasonable amount of effort for manipulation and is comparatively safe and not likely to inflict injury when being manipulated.

The above being a complete description of an illustrative embodiment of the invention, what is claimed as new and desired to be secured by Letters Patent of the United States is:

1. In a harrow having a laterally extending tubular frame, said frame comprising a main member and an extension member, said extension member telescoping within said main member, a helical aperture extending axially and peripherally in the wall of said main member, downwardly depending brackets secured to said main and extension members, disk gangs journaled on said brackets, one of said brackets secured to said extension member being so arranged as to cooperate with said helical aperture to rotate said extension member upon moving the latter axially, and stop means on one of said members and engageable with the other member to prevent inadvertent withdrawal of said extension member from said main member.

2. In a harrow having a laterally extending tubular frame, said frame comprising a main member and an extension member, said extension member being arranged for telescopic relation with said main member, said main member being provided with a helical slot, inner and outer gangs of disks depending from said main and extension members, an inner and an outer bracket depending from said extension member, said inner bracket cooperating with said helical slot so as to rotatably guide said extension member when the latter is displaced axially.

3. In a harrow having a laterally extending tubular frame, said frame comprising a main frame and an extension frame, said extension frame being arranged for telescopic relation with said main frame, said main frame being provided with a slot disposed at an angle to the axis of said main frame, brackets depending from said main and extension frames, gangs of inner and outer disks supported from said brackets, one of said brackets on said extension frame being arranged to cooperate with said slot so as to rotatably guide said extension frame when the latter is displaced axially.

4. In a disk harrow comprising two oppositely extending disk gangs each including a main gang and an extension gang, a main tubular member for the main gang and an extension tubular member for the extension gang, brackets secured to said tubular frame members, said extension tubular member being constituted to telescope within a portion of the main tubular member adjacent one end thereof for reducing the over-all width of the disk harrow, said main tubular member providing a spirally disposed slot in the wall thereof in the portion into which said extension member telescopes, one of said brackets on said extension tubular member projecting outwardly through said slot, said bracket having a twisted configuration for conformation with said slot where it passes therethrough and being of a lesser extent axially of said tubular member than said slot and slidable in said slot to guide said extension tubular member in a spiral direction in its telescoping movement.

5. In a disk harrow comprising two oppositely extending disk gangs each including a main gang and an extension gang, a main tubular member for the main gang and an extension tubular member for the extension gang, brackets supported from said tubular members and connected with said disk gangs, said extension tubular member being constituted to telescope within the main tubular member adjacent one end thereof for reducing the over-all width of the disk harrow, said main tubular member providing a spirally disposed slot in the wall thereof in the portion into which said extension member telescopes, one of said brackets on said extension tubular member projecting outwardly through said slot, said bracket being of a lesser extent axially of said tubular member than said slot and slidable in said slot to guide said extension tubular member in a spiral direction in its telescoping movement, and the lead of the spiral slot being sufficiently fast to support said bracket and said extension tubular member and gang in partially retracted position by frictional engagement of said bracket with the walls of said spirally disposed slot to prevent rapid uncontrolled downward movement of said extension gang.

FRANK N. G. KRANICK.

References Cited in the file of this patent

UNITED STATES PATENTS

| Number | Name | Date |
|---|---|---|
| 579,622 | Whipple | Mar. 30, 1897 |
| 841,794 | Line | Jan. 22, 1907 |
| 1,560,639 | Andrews | Nov. 10, 1925 |
| 2,098,116 | Warne | Nov. 2, 1937 |
| 2,306,127 | Johnston et al. | Dec. 22, 1942 |